(12) United States Patent
Yusibov et al.

(10) Patent No.: US 9,032,664 B2
(45) Date of Patent: May 19, 2015

(54) CASCADING PLANT GROWTH SYSTEM AND PLANT GROWTH TRAY

(75) Inventors: Vidadi Yusibov, Havertown, PA (US); Joey Norikane, Elkton, MD (US)

(73) Assignee: Fraunhofer USA Inc., Newark, DE (US)

( * ) Notice: Subject to any disclaimer, the term of this patent is extended or adjusted under 35 U.S.C. 154(b) by 89 days.

(21) Appl. No.: 13/517,114

(22) PCT Filed: Dec. 8, 2010

(86) PCT No.: PCT/US2010/059352
§ 371 (c)(1),
(2), (4) Date: Jul. 19, 2012

(87) PCT Pub. No.: WO2011/084312
PCT Pub. Date: Jul. 14, 2011

(65) Prior Publication Data
US 2012/0279127 A1 Nov. 8, 2012

Related U.S. Application Data

(60) Provisional application No. 61/288,542, filed on Dec. 21, 2009.

(51) Int. Cl.
*A01G 31/00* (2006.01)
*A01G 31/06* (2006.01)
(52) U.S. Cl.
CPC .............. *A01G 31/06* (2013.01); *A01G 31/00* (2013.01)
(58) Field of Classification Search
CPC ........ A01G 31/00; A01G 31/06; A01G 9/047
USPC ............. 47/62 C, 62 R, 62 N, 65, 65.52, 65.9
See application file for complete search history.

(56) References Cited

U.S. PATENT DOCUMENTS

| 2,007,479 | A | * | 7/1935 | Salles et al. | 119/242 |
| 2,896,374 | A | * | 7/1959 | Gaston | 47/62 R |

(Continued)

FOREIGN PATENT DOCUMENTS

| CH | 697 385 B1 | 9/2008 |
| CN | 2206542 Y | 9/1995 |

(Continued)

OTHER PUBLICATIONS

Machine translation of Kono et al. (JP07-231731).*

(Continued)

*Primary Examiner* — Rob Swiatek
*Assistant Examiner* — Morgan T Barlow
(74) *Attorney, Agent, or Firm* — RatnerPrestia (57) ABSTRACT

A plant growth container includes a tray, an inlet channel in the tray, a growth media retainer in the tray, one or more protrusions within the growth media retainer, an outlet channel connected to the growth media retainer, and a lid capable of being fixedly attached to the tray. The tray can be used in a hydroponic growth system for plants, where the system includes a container for growing plants. The container includes a tray, an inlet channel in the tray, a growth media retainer in the tray connected to the inlet channel, one or more protrusions in the growth media retainer, the protrusions capable of securing growth media from lateral movement, an outlet channel connected to the growth media retainer, and a lid. The system may include a reservoir for holding a liquid and a pump capable of pumping the liquid from the reservoir to the container.

26 Claims, 6 Drawing Sheets

(56) References Cited

U.S. PATENT DOCUMENTS

| | | | |
|---|---|---|---|
| 3,992,809 A * | 11/1976 | Chew | 47/62 R |
| 4,144,671 A * | 3/1979 | Lee | 47/14 |
| 4,218,847 A * | 8/1980 | Leroux | 47/59 R |
| 4,312,152 A * | 1/1982 | Drury et al. | 47/63 |
| 4,513,533 A * | 4/1985 | Gething et al. | 47/63 |
| 5,692,612 A * | 12/1997 | Weder et al. | 206/423 |
| 5,992,090 A * | 11/1999 | Stutte et al. | 47/58.1 R |
| 5,996,280 A * | 12/1999 | Michailiuk | 47/86 |
| 6,000,173 A * | 12/1999 | Schow et al. | 47/62 R |
| 6,067,750 A * | 5/2000 | Lai | 47/62 R |
| 6,276,089 B1 * | 8/2001 | Boisclair et al. | 47/62 A |
| 6,336,292 B1 * | 1/2002 | Boxsell | 47/62 C |
| 6,601,342 B2 * | 8/2003 | Dummen | 47/62 C |
| 6,604,321 B2 * | 8/2003 | Marchildon | 47/62 R |
| 7,080,482 B1 * | 7/2006 | Bradley | 47/60 |
| 7,565,768 B2 * | 7/2009 | Bula | 47/89 |
| 8,181,391 B1 * | 5/2012 | Giacomantonio | 47/62 R |
| 2001/0047617 A1 * | 12/2001 | Blossom | 47/62 R |
| 2002/0078625 A1 * | 6/2002 | Boxsell et al. | 47/62 C |
| 2003/0056437 A1 * | 3/2003 | Costa | 47/62 R |
| 2005/0155286 A1 * | 7/2005 | Soukup | 47/60 |
| 2006/0112630 A1 * | 6/2006 | Kimes | 47/62 C |
| 2006/0156624 A1 * | 7/2006 | Roy et al. | 47/62 R |
| 2007/0271841 A1 * | 11/2007 | Bissonnette et al. | 47/61 |
| 2008/0302010 A1 * | 12/2008 | Cordon | 47/59 R |
| 2010/0269409 A1 * | 10/2010 | Johnson | 47/62 N |
| 2011/0056132 A1 * | 3/2011 | Gardner | 47/62 R |
| 2011/0107667 A1 * | 5/2011 | Laurence et al. | 47/59 S |

FOREIGN PATENT DOCUMENTS

| | | | | |
|---|---|---|---|---|
| FR | 1 271 294 A | | 9/1961 | |
| FR | 2584262 A1 * | | 1/1987 | A01G 31/02 |
| GB | 2368767 A * | | 5/2002 | A01G 31/06 |
| JP | 07231731 A * | | 9/1995 | A01G 31/00 |
| JP | 2006197843 A * | | 8/2006 | |
| JP | 2007117089 A * | | 5/2007 | |
| JP | 2007159410 A * | | 6/2007 | |
| JP | 2010259345 A * | | 11/2010 | |
| JP | 2011067172 A * | | 4/2011 | |
| JP | 2011083230 A * | | 4/2011 | |
| NL | 8 202 859 A | | 2/1984 | |

OTHER PUBLICATIONS

JP translation, JP2007-117089. <http://www19.ipdl.inpit.go.jp/PA1/cgi-bin/PA1INIT?1181685164439>.*

PCT/US2010/059352 International Search Report by N. Schlichting dated Apr. 26, 2011.

* cited by examiner

CASCADING PLANT GROWTH SYSTEM AND PLANT GROWTH TRAY

CROSS REFERENCE TO RELATED APPLICATIONS

This application is a U.S. national phase application of PCT International Application, PCT/US2010/059352, filed Dec. 8, 2010 claiming priority to provisional application number U.S. 61/288,542, filed Dec. 21, 2009, which is incorporated herein, in its entirety, by reference.

FIELD OF THE INVENTION

This application relates to a vertically stacked hydroponic growth system for plants. This application also relates to a container tray designed for use with the system such that plants may be securely placed in the tray so that the trays may be moved around during the growing and harvesting process without damaging the plants.

BACKGROUND OF THE INVENTION

Plants may be used for many different commercial applications, and in most cases, efficient plant growth positively affects their commercial value. For example, plants may be used to express proteins in large quantities (e.g. proteins to be used in the creation of vaccines). In such a case, the more robustly the plant grows, the more protein product is produced. Many challenges exist in growing plants efficiently and robustly, while keeping overhead costs down. For example, plants benefit from sources of nutrition (e.g. nutrition solutions, fertilizers, etc.) and from controlled environmental conditions (e.g. temperature, light, etc.), which can be costly. In addition, plants take up a large amount of space, which further contributes to the overhead costs of using plants for commercial purposes.

Thus, there is a need for improved systems and methods of growing plants which are less costly, more space-efficient methods of growing plants, and which more efficiently utilize a nutrition source provided to plants by a grower.

SUMMARY OF THE INVENTION

In a first aspect, a plant growth container includes a tray, an inlet channel in the tray, a growth media retainer in the tray and connected to the inlet channel, one or more protrusions within the growth media retainer, the protrusions capable of securing growth media from lateral movement, an outlet channel connected to the growth media retainer, and a lid capable of being fixedly attached to the tray.

In a second aspect, a hydroponic growth system for plants includes at least one container capable of growing plants, the at least one container including a tray, an inlet channel in the tray, a growth media retainer in the tray and connected to the inlet channel, one or more protrusions in the growth media retainer, the protrusions capable of securing growth media from lateral movement, an outlet channel connected to the growth media retainer, and a lid capable of being fixedly attached to the tray, the system additionally comprising a reservoir capable of holding a liquid, and a pump capable of pumping the liquid from the reservoir to the at least one container.

BRIEF DESCRIPTION OF THE DRAWINGS

The present invention relates to a cascading hydroponic growth system for plants and a container for use in a cascading hydroponic growth system for plants. The foregoing summary, as well as the following detailed description of exemplary embodiments of the invention, will be better understood when read in conjunction with the appended drawings, which are incorporated herein and constitute part of the specification. It will be understood that the invention is not limited to the precise arrangements and instrumentalities shown. In the drawings.

DETAILED DESCRIPTION OF EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

A container in accordance with one embodiment of the invention is fit with a growth media, such as a substrate. The container then immobilizes the media, preventing the media from moving up and down in the container, and preventing the media from moving laterally in the container. Furthermore, the container is designed to allow a continuous flow of a liquid, such as a nutrient solution, through the container. The liquid enters the container at a given location, flows through the container and then exits the container. The container includes an outflow area that is configured to cause solution to back up in the container to a predetermined level or stage before discharging out of the container. This backing up of solution provides a certain minimum level of solution in the container, ensuring that the substrate is kept wet to a predetermined percentage of the substrate's height.

Figure 1:
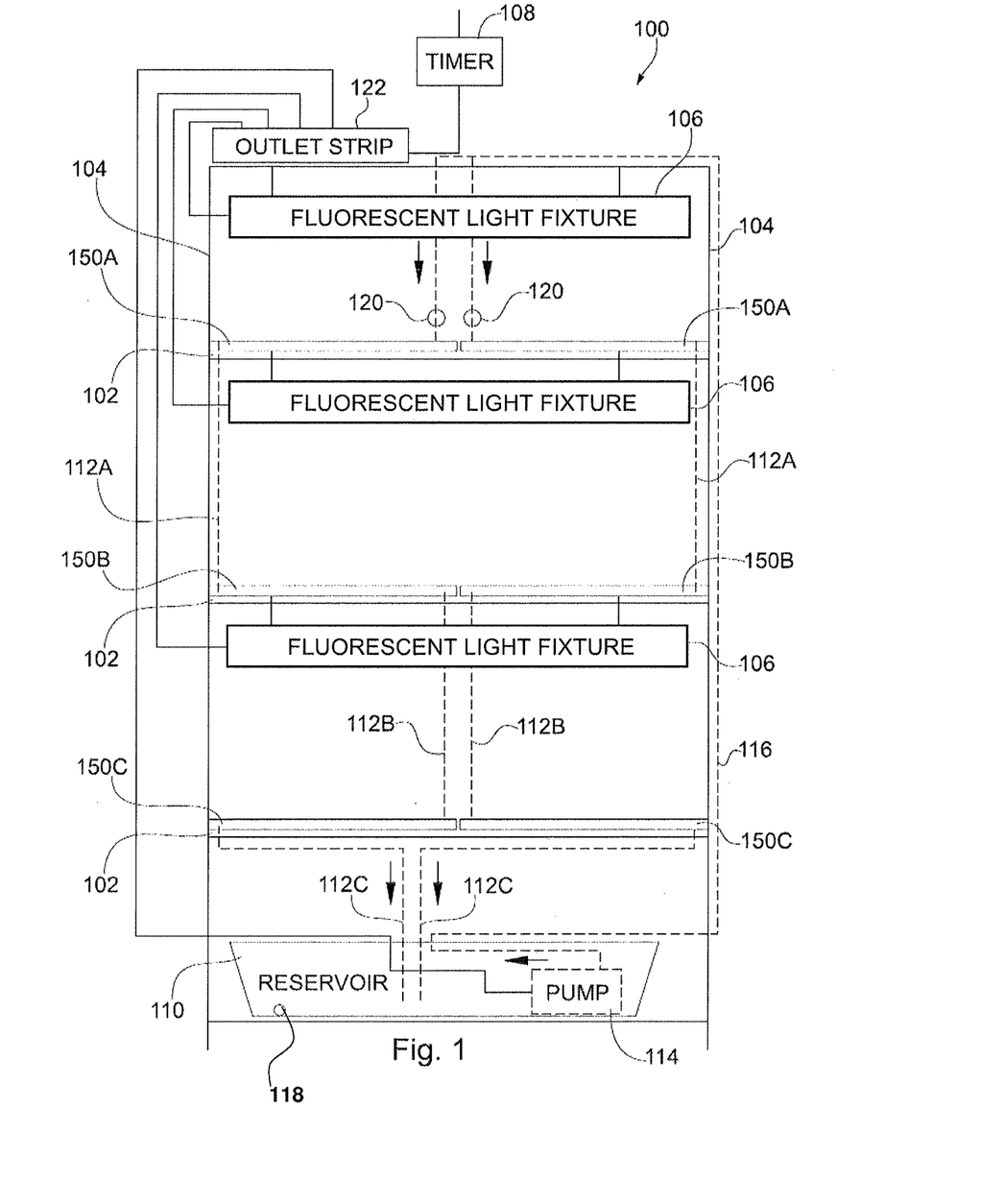
FIG. 1 is a front-view of a cascading hydroponic growth system in accordance with one embodiment of the present invention.

As shown in FIG. 1, a system having at least one shelving unit 100 in accordance with one embodiment of the invention is comprised of a series of hydroponic containers 150A-150C in a vertical arrangement. In a preferred embodiment of the invention, the shelving unit 100 includes several components. For example, shelving unit 100 includes several shelves 102 that are connected by columns 104. Three of the shelves each support a pair of tray containers. Hanging underneath each shelf 102 are one or more fluorescent light fixtures 106. Fluorescent lights 106 may be connected to a timer 108 that will control when the fluorescent lights 106 are on and off. It is understood that fluorescent lights 106 may also be connected to a central power source where they may be turned on or off manually. Tray containers 150 are interconnected to one another via a series of cascading tubes 112A, 112B and 112C.

Top container trays 150A are hydraulically connected to reservoir 110. Reservoir 110 may contain pure water, a water nutrient mix, or a pure nutrient mix. Reservoir 110 is connected to circulating pump 114. Circulating pump 114 pumps the contents of the reservoir 110 through feed line 116 to top containers 150A. Although circulating pump 114 is shown as a submerged pump placed internally in reservoir 110 in FIG. 1, it is understood that circulating pump 114 may be any type of pump, such as a pump placed externally to reservoir 110. The nutrient solution is then circulated through containers 150A. As the nutrient solution makes its way through containers 150A it will eventually discharge out of the containers into cascading tubes 112A and enter into containers 150B. The solution then makes its way through containers 150B in the same manner that the solution passed through containers 150A, and discharges into cascading tubes 112B. Tubes 112B carry the solution into containers 150C. The solution then makes its way through containers 150C in the same manner that the solution passed through containers 150A and 150B, and discharges into cascading tubes 112C, which in turn convey the solution back to the reservoir 110.

Reservoir 110 is equipped with stopcock 118 which will normally be kept in the closed position but can be opened to allow for draining of the reservoir 110. Reservoir 110 may also come equipped with a cover that securely fits over the reservoir and only allows cascading tubes 112C and feed line 116 into and out of the reservoir. The cover may be helpful to limit foreign substances from contaminating the nutrient solution and limit evaporation. In some exemplary embodiments, reservoir 110 and its cover are opaque and fit tightly together to prohibit the entrance of light into the reservoir. This prevents algae from growing in the nutrient solution. Furthermore, reservoir 110, when equipped with a cover, may have an opening that may be opened to allow additional nutrient solution to be added, or to sample the nutrient solution to test whether it is at its desired efficacy. In configurations where more than one container sits on a shelf, as shown in FIG. 1, feed line 116 may split apart at the top of the shelves so that the nutrient solution may be directed to sets of containers that sit side by side or end to end. In the alternative, two or more independent feed lines may be used to convey the nutrient solution from pump 114 to the top trays. At the top of the shelf, feed line 116 may be attached to one or more stopcocks 120, which allow the user of the unit to block off all nutrient solution access to the tray containers. Finally, fluorescent light fixtures 106 may be optionally connected to an outlet strip 122 that is attached to the unit to supply power to the fluorescent lights.

In one embodiment of the present invention, shelving unit 100 will be four shelves high and capable of holding two containers end to end. It will be understood however, that shelving unit 100 may contain any number of shelves and fit any number of containers. Furthermore, it is understood that shelving units 100 may be arranged such that the trays may still receive the nutrient solution in the event that one or more containers have been removed from the shelving unit. Shelving units 100 may be placed in groups with aisles to allow for the best use of space and for removal of containers and fluorescent lights as needed. Preferably, the light fixtures and containers have relative dimensions that facilitate easy insertion and removal of containers to and from shelving units, while minimizing the required height of each shelf space, and thus minimizing the dimensions of the shelving units, so as to maximize the use of space. It is also understood that cascading tubes 112 and feed lines 116 may be set to any length such that longer or shorter tubes or feed lines may be substituted into the shelving unit in the event that a shelf 102 is empty and no longer holds a container. This allows the system to bypass one or more shelves that are emptied or taken out of service, and supply nutrient solution directly to any remaining containers beneath the bypassed shelf or shelves.

Figure 2:
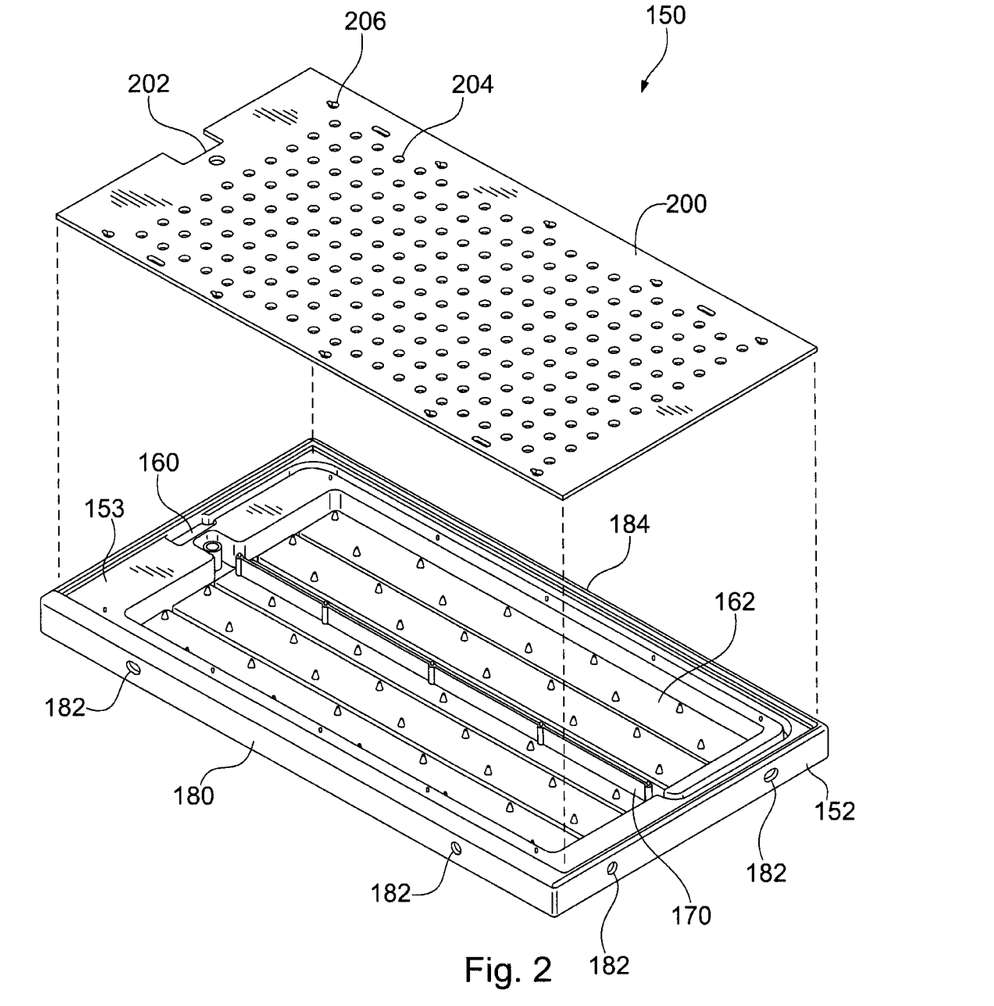
FIG. 2 is an exploded perspective-view of a tray in accordance with one embodiment of the present invention.

FIGS. 2 through 11 show various components of a plant growth container 150 in accordance with one embodiment of the invention. FIG. 2 shows an exploded view of container 150 which includes a generally rectangular tray 152 and a generally rectangular lid 200. Tray 152 contains a drop inlet or inlet channel 160 with a flat receiving pool, wherein the nutrient solution may enter the tray. After the nutrient solution enters inlet channel 160, it flows along the inlet channel to the opposite end of the tray where it enters a growth media retainer 162. The nutrient solution will then flow through the growth media retainer to an outlet channel 164. Growth media retainer 162 contains a support ridge 170, used to provide lateral support and rigidity along the length of the tray. For purposes of describing the relative size of the container 150 and its features, the term "length" refers to the dimension parallel to the longer side of the container shown in FIG. 4, and the term "width" refers to the dimension parallel to the shorter side shown in FIG. 4.

In some embodiments of the present invention, multiple support ridges 170 may extend along, i.e. generally parallel to, the length of the tray to further add support and rigidity to the tray 152. Furthermore, in some embodiments, support ridges 170 may extend along the width of the tray, with or without one or more ridges extending along the length of the container 150. Tray 152 is equipped with several robotic manipulator openings 182 defined by the side walls 180 of the tray. These robotic manipulator openings 182 are spaced at pre-determined intervals and allow for automated machinery to pick up the tray 152 and move it as needed. The side walls 180 of tray 152 are raised slightly higher than the inside top face 153 of tray 152 to provide for an outer ridge 184 that surrounds the entire tray 152. Lid 200 is sized to fit just inside outer ridge 184 to allow for minimal movement by lid 154 when tray 152 is moved laterally, up and down, or flipped over. Lid 200 is equipped with an inlet cover cut-out 202 which when lid 200 is placed overtop of tray 152, allows inlet channel 160 to be exposed. Lid 200 is also equipped with a plurality of plant growth openings 204 which allow spaces for plants to grow through. Lid 200 is secured to tray 152 by a plurality of slot openings 206 resembling keyhole-type slots. Slot openings 206 consist of a large round opening that a fastener, such as a pin may be inserted through. A smaller opening connects to the larger opening that will then hold the lid in place with the pin. Slot openings 206 may also interact with securing columns that are built onto the edge of inside top face 153. In some embodiments, slot openings 206 may also be placed in the middle of lid 200 to interact with pins or securing columns that may be provided on the top of support ridge 170. It is understood that in an alternative embodiment, the slot openings 206 may be cut into tray 152 and the pins or securing columns may be built onto the lid.

Figure 3:
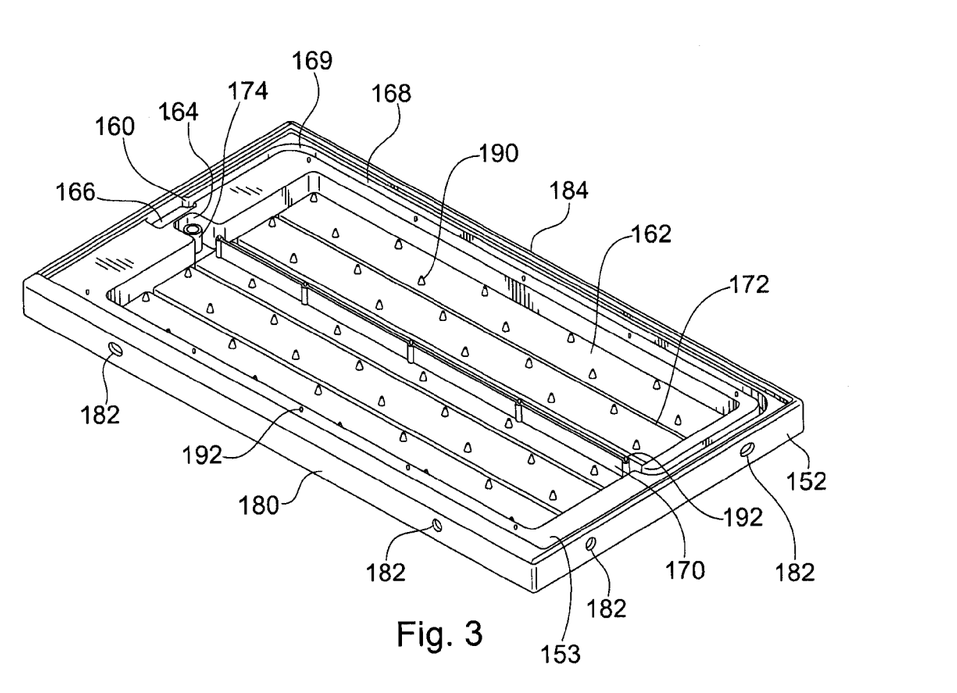
FIG. 3 is a perspective-view of a tray component in accordance with one embodiment of this invention.
Figure 4:
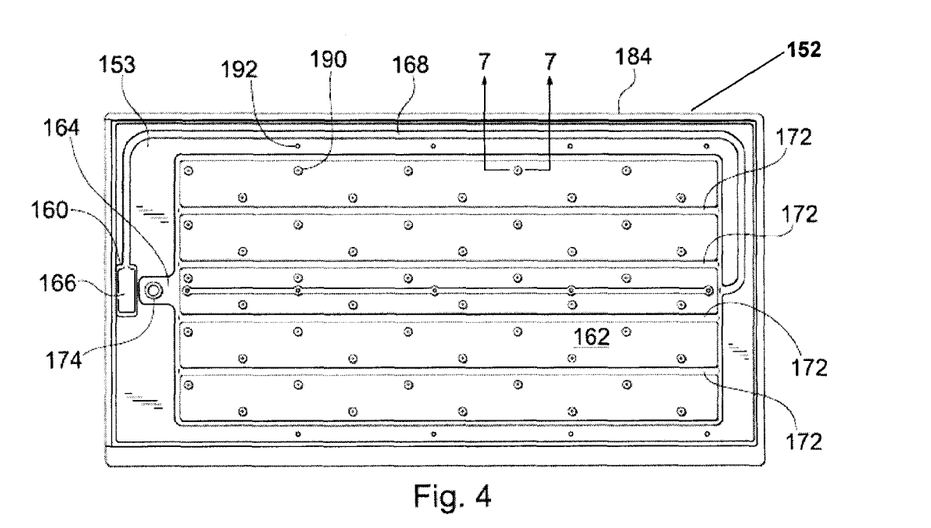
FIG. 4 is a top-view of a tray component in accordance with one embodiment of the invention.

FIG. 3 shows a perspective view of tray 152 and FIG. 4 shows a top-view of tray 152. Tray 152 may be made of plastic or other material. As shown in FIGS. 3 and 4, inlet channel 160 comprises an inlet receiving area 166 and a sloped channel 168 that will allow the nutrient solution to flow from the inlet receiving area 166 to the growth media retainer 162.

When container 150 is placed on a horizontal flat surface, the bottom of sloped channel 168 has its highest elevation relative to the flat surface adjacent inlet channel 160, and its lowest elevation relative to the flat surface where the channel connects with growth media retainer 162. The bottom of sloped channel 168 gradually descends from the highest elevation point to the lowest elevation point to facilitate gravity flow of liquid from inlet channel 160 to growth media retainer 162.

Growth media retainer 162 is a recessed area in the tray that comprises additional sloped channels 172. Sloped channels 172 allow the nutrient solution to continually flow towards the outlet channel 164. Growth media retainer contains a plurality of growth media protrusions 190, which are used to secure the growth media and prevent any lateral movement of the growth media. Growth media retainer 162 is bisected by support ridge 170 which adds support to the tray structure. In the illustrated embodiment, support ridge 170 includes securing columns 192 which can be inserted through the slot openings 206 of lid 200. Tray 152 also has securing columns 192 positioned around the outside of the tray to be inserted through slot openings 206 of lid 200. Outlet channel 164 is comprised of a standing pipe 174 and a small drain hole 176, as seen best in FIG. 10.

Figure 7:
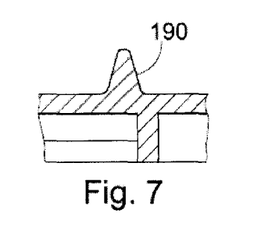
FIG. 7 is a cross-sectional view of a media securing protrusion taken through line 7-7 of FIG. 4.

Growth media retainer 162 is designed to hold various types of growth media. Growth media substrate may be either a substrate of mineral wool, such as rockwool. Alternatively, the substrate may be formed of a hydrophilic foam, such as Agrifoam® brand foam or Oasis® brand foam. The substrate may also be formed of coconut fiber, perlite or other similar organic or synthetic substrate. Growth media retainer 162 may be sized to fit two 10 inch by 20 inch pieces of rockwool end to end on one side of support ridge 170 and two pieces of 10 inch by 20 inch rockwool on the other side of support ridge 170. It is understood, however, that growth media retainer 162 may be made to any size and may be divided in any way so as to accommodate growth media substrates of different shapes and dimensions. The growth media substrate can be placed in the growth media retainer and secured in a fixed position by growth media protrusions 190. Protrusions 190 are spaced throughout the bottom of the growth media retainer and may be spaced to align with pre-placed indentations in the growth media substrate. As shown in FIG. 7, protrusion 190 may be a molded component integrally formed on the floor of the growth media retainer 162. It is understood that protrusions 190 may be integrally formed to any height required by the substrate and may also be of any shape or slope as required to secure the growth media substrate. Once the growth media substrate has been placed in the growth media retainer 162 and secured, seeds may be placed on the top of the substrate at a spacing that corresponds with the plant growth openings 204 that are defined in lid 200. Lid 200 will then be aligned so that slot openings 206 align with securing columns 192. Once lid 200 is flush against the upper face of tray 152, lid 200 can be slid along securing pins 192 to secure lid 200 in place on tray 152.

Once lid 200 is secured to tray 152, the tray container 150, complete with growth media substrate and seeds, is ready to be placed on a shelf of a hydroponic plant growth system, such as that shown in FIG. 1. Referring to FIGS. 1, 3, 4 and 8, nutrient solution treatment will be pumped from reservoir 110 to the top trays 150A of the system. The nutrient solution will initially enter each tray 150A in its respective inlet receiving area 166 of inlet channel 160. The nutrient solution will make its way through the sloped channel 168 of the inlet channel 160 and into the growth media retainer 162. Once in the growth media retainer 162, the nutrient solution will continue towards the outlet channel 164 along sloped channels 172. When the nutrient solution comes to outlet channel 164, it will begin to drain through small drain hole 176, shown in FIG. 10. The input flow of the nutrient solution into the inlet channel 160 may be adjusted using stopcocks 120 and circulating pump 114 so that the input flow is greater than the output flow through small drain hole 176. Because the input flow is greater than the output flow, the nutrient solution will back up in the growth media retainer 162 and saturate the growth media substrate, thereby providing the seeds on the growth media substrate with the nutrients needed to grow. In one embodiment of the present invention, the height of the rockwool substrate is 1.6 inches, and the nutrient solution preferably rises to at least 70-75% of the height of the rockwool substrate. This preferred level allows the solution to migrate to the top of the substrate by capillary forces.

Figure 10:
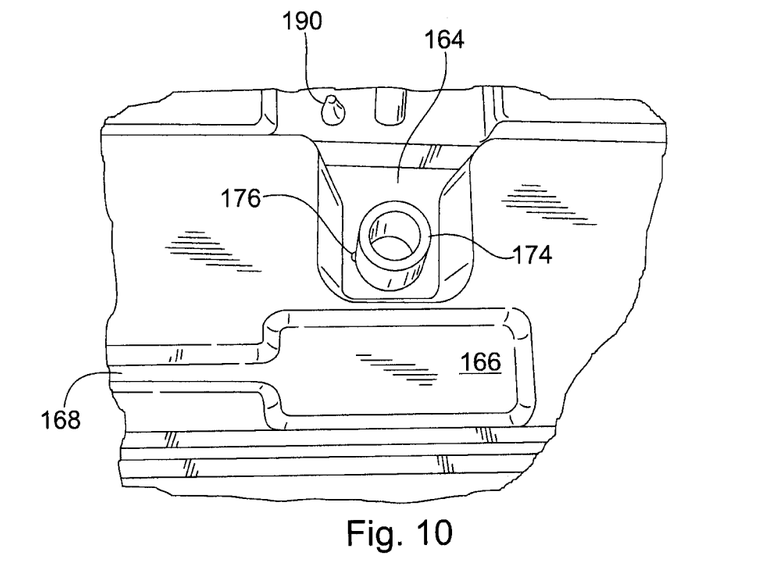
FIG. 10 is an enlarged top-view of the tray component of FIG. 3 showing a drainage feature.

The nutrient solution will continue to build up in the media growth retainer 162 until it reaches the height of the standing pipe 174 at which point the nutrient solution will spill over the top of the standing pipe 174 and exit the tray container 150A. As shown in FIG. 10, the standing pipe 174 and the small drain hole 176 comprise the outlet channel 164. Once the nutrient solution has entered the outlet channel 164, it will pass through the first cascading tubes 112A and continue to one of the tray containers 150B on the next highest shelf. The nutrient solution then fills trays 150B, discharges through tubes 112B, fills trays 150C, discharges through tubes 112C, and finally returns to reservoir 110. In some embodiments of the present invention, the nutrient solution that exits containers 150A, 150B and 150C through the outlet channel 164 will be collected in a funnel before it enters a cascading tube. After the plants have matured to the point where they are ready to be harvested, nutrient solution circulating system is turned off, either by the use of stopcocks 120 or by turning off circulating pump 114. Small drain hole 176 allows any standing nutrient solution to be drained from the tray and eventually returned to the reservoir. It is preferable to totally drain the tray container of any nutrient solution that may be still standing before attempting to move the tray container. Cascading tubes 112A, 112B and 112C attach securely to the bottoms of containers 150A, 150B and 150C, respectively, so that any nutrient solution overflowing and passing through the standing pipe, as well as any solution passing though the drainage hole, is captured in the cascading tube. In some embodiments of the present invention, the bottoms of the trays 152 have special fittings designed to allow cascading tubes to be attached to them to aid in this process. Furthermore, lid cut out 202 may be designed so that it securely attaches to the end of a cascading tube in a tight seal to prevent the leakage of nutrient solution as it is transferred from one tray to another. In these embodiments, lid cut out 202 may also be attachable to the end of a feed line 116 to prevent the leakage of nutrient solution as it is pumped in from the reservoir.

Figure 5:
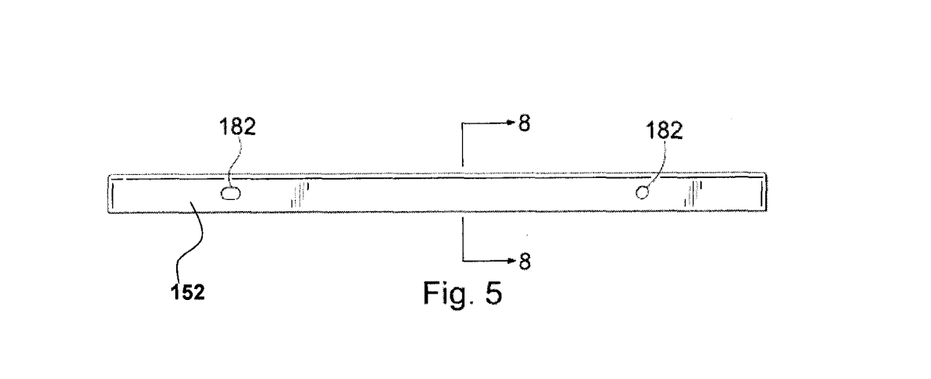
FIG. 5 is a side-view of a tray component in accordance with one embodiment of the invention.
Figure 6:
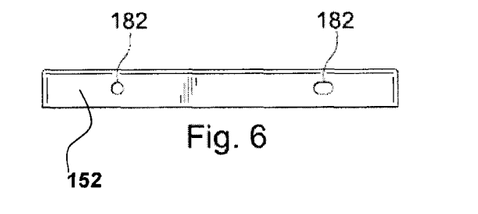
FIG. 6 is an end-view of a tray component in accordance with one embodiment of the invention.
Figure 8:
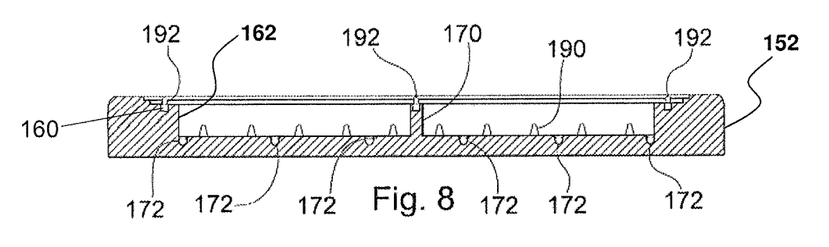
FIG. 8 is a cross-sectional end-view of the tray taken through line 8-8 of FIG. 5.
Figure 9:
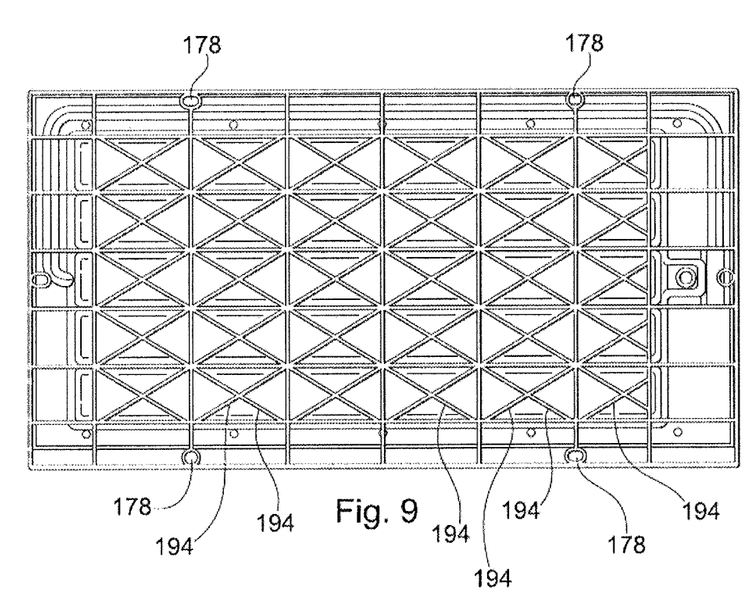
FIG. 9 is a bottom-view of a tray component in accordance with one embodiment of the invention.

FIGS. 5 and 6 show the sides of tray 152. Tray 152 may be automatically manipulated by robotic arms as it progresses through the growth cycle. Once the plants have grown to an age where they may be harvested, robotic arms will remove each tray container 150 from the shelving unit 100. To move tray container 150, the arms are inserted into robotic manipulator openings 182. In one embodiment of the present invention, robotic manipulator openings 182 may be shaped as a circle, or as an oval to allow the robotic manipulator arms some leeway in grasping the tray 152. FIG. 8 shows a cross-sectional view of tray 152. Growth media protrusions 190 extend from the floor of the growth media retainer 162. Furthermore, FIG. 8 shows a view of sloped channels 172 as they gradually slope towards the outlet channel 164 (the channels shown sloping towards the viewer in FIG. 8). FIG. 9 shows the bottom view of tray 152. To add structural support to the tray, the bottom comprises a series of cross supports 194. These cross supports 194 provide additional structural support and load bearing strength for the load tray 152, while reducing the amount of material and the overall weight of the tray. It is understood that the shape and design of these cross supports 194 is not limited to the shape and design shown in FIG. 9. Additionally, FIG. 9 shows legs 178 on which tray 152 sits. Legs 178 may also be used to move tray 152 through the automated processes. In some embodiments, legs 178 may also be designed to interact with receptacles on the shelf 102 to securely hold the tray in place. In other embodiments, legs 178 may be designed and placed to interact with the top of another tray so as to allow unused trays to be stacked for more convenient storage.

Figure 11:
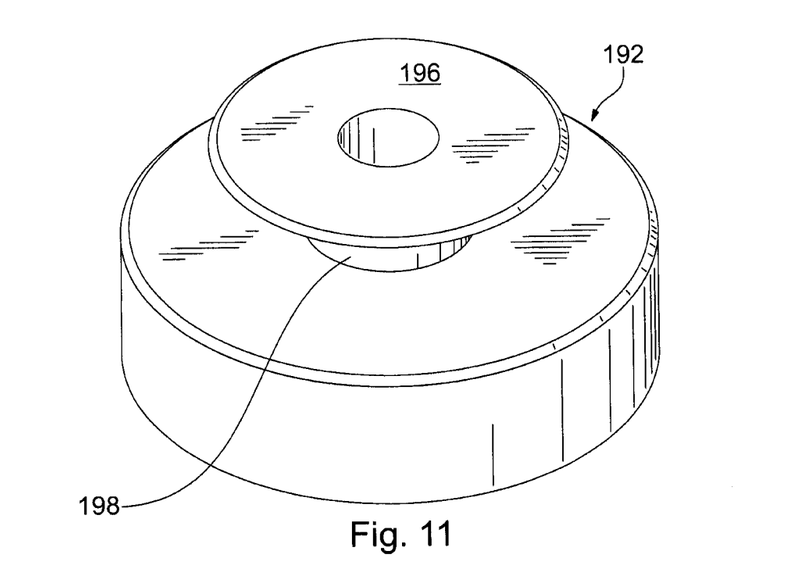
FIG. 11 is a perspective view of a clip component of FIG. 3 in accordance with one embodiment of the present invention.

FIG. 11 shows a perspective view of securing fastener column 192. Securing column 192 has a large upper portion 196 with a circumference, and a middle portion 198 with a circumference smaller than the circumference of the upper portion. To secure lid 200 to tray 152, each lid slot 206 is placed with its larger portion 196 over a securing column 192 until it reaches the depth of middle portion 198. At that point, lid 200 may be slid laterally to lock the smaller portion of lid slot 206 around the middle portion 198 of securing column 192. Lid 200 is preferably made of stainless steel to provide additional support in instances where the tray container 150 is inverted or turned upside down.

In the illustrated embodiment, lid 200 is secured to tray 152 by securing columns 192 that are intermittently spaced around the circumference of the tray 152 and additional securing columns intermittently spaced along support ridge 170. Lid 200 is secured flush against the face of the tray 152 by securing columns 192 and sits inside outer ridge 184. By placing lid 200 within outer ridge 184, the lid is secured from lateral movement, minimizing the chances that splashed nutrient solution will seep or migrate along the lid and outside the tray container assembly 150. In one embodiment of the present invention, lid 200 may be removed and secured in place through the use of a robotic arm.

It is desirable to prevent any vertical movement of the growth media (i.e. toward and away from lid 200), and any lateral movement of the growth media (i.e. side to side shifting of the media in retainer 162). If lateral movement occurs, there is a risk that grown plants extending through holes 204 may be sheared off at their stems. Some processes involving the present invention may require the tray container to be turned upside down to allow the plants to be dipped into a treatment bath. In these processes, it is important that the growth media substrates cannot move in the vertical direction so that the plants will not be crushed against the lid or sheared off at the stem. After the plants in the tray container 152 have been treated and harvested, lid 200 will be removed either manually or automatically, and the growth media substrate will be discarded. The tray may then be prepared to be used in the process once again.

As noted above, preferred trays in accordance with the invention are structurally reinforced and rigid. Rigidity of the tray keeps the substrate stabilized within the tray, and keeps the substrate in the flat position even when the tray is lifted and moved. Lid 200 is preferably secured to the outer perimeter of the top of the tray, as well as on the top of support ridge 170. In this arrangement, lid 200 will not bend or buckle under the weight of the substrate when the tray is inverted during processing of the grown plants. Bending or buckling of lid 200 during inversion of the tray will cause the substrate and plants to move vertically in the tray, potentially killing the plants. Lateral movement of the substrate in the tray is prevented by protrusions 190, support ridge 170 and the inner walls of the retainer 162. As noted above, this prevents plants from being damaged by lateral movement, particularly the plants that grow up through holes 204 in lid 200.

The tray preferably includes a number of enhancements to minimize leaking of nutrient solution out of the tray. As noted above, the top of tray 150 preferably has a recess, and lid 200 sits in this recess. The recess has a bottom, and a substantial portion of the lid overlaps the recess bottom. The lid sits flush against the recess bottom to form a tightly sealed or substantially sealed edge around the lid. Nutrient solution that happens to splash up on the underside of the lid (when the tray is upright) cannot readily seep out of the recess in this arrangement. Moreover, the bends in the sloped channel 168, for example the first bend 169 in FIG. 3, has an enlarged radius to decrease the sharpness of the bend, minimizing the potential for solution to splash out of the channel and onto the lid when being introduced at higher flow velocities.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention. A number of photographs and drawings are provided with this description, in addition to the above-referenced drawing figures, to further illustrate structural, functional and ornamental aspects of exemplary embodiments of the invention.

What is claimed:

1. A container comprising:
a tray having an outer ridge;
an inlet channel defined within the outer ridge of the tray;
a growth media retainer defining a recessed area within the tray and connected to the inlet channel downstream of said inlet channel, the recessed area having a perimeter completely surrounded by the outer ridge;
a plurality of protrusions within the growth media retainer, said protrusions capable of securing growth media from lateral movement;
an outlet channel connected to the growth media retainer downstream of said growth media retainer; and
a lid fixedly attached to the tray inside the outer ridge to cover the entire recessed area so that the lid remains attached over the entire recessed area when the tray is turned upside down.

2. The container of claim 1 further comprising a plurality of openings defined in the lid.

3. The container of claim 1 further comprising a plurality of openings defined along a side of the tray.

4. The container of claim 3 further comprising a plurality of openings defined along a plurality of sides of the tray.

5. The container of claim 1 wherein the inlet channel comprises a flat receiving pool to receive liquid from another container.

6. The container of claim 1 wherein the outlet channel comprises a standing pipe and a drain hole.

7. The container of claim 1 wherein the growth media retainer comprises a structural support barrier.

8. The container of claim 1 wherein the lid comprises an inlet receiving section.

9. The container of claim 1 wherein the growth media retainer comprises a plurality of sloped grooves.

10. The container of claim 1 wherein the growth media retainer comprises a growth media.

11. The container of claim 10 wherein the growth media consists of one of rockwool, hydrophilic foam, coconut fiber and perlite.

12. A hydroponic growth system for plants comprising:
A. at least one container capable of growing the plants, the at least one container comprising:
(1) a tray having an outer ridge;
(2) an inlet channel defined within the outer ridge of the tray;
(3) a growth media retainer defining a recessed area within the tray and connected to the inlet channel downstream of said inlet channel, the recessed area having a perimeter completely surrounded by the outer ridge;
(4) a plurality of protrusions within the growth media retainer, said protrusions capable of securing growth media from lateral movement;
(5) an outlet channel connected to the growth media retainer downstream of said growth media retainer; and
(6) a lid fixedly attached to the tray inside the outer ridge to cover the entire recessed area so that the lid remains attached over the entire recessed area when the tray is turned upside down;
B. a reservoir capable of holding a nutrient solution; and
C. a pump capable of pumping the nutrient solution from the reservoir to the at least one container.

13. The hydroponic growth system of claim 12 further comprising at least one light source attached to the system capable of providing light to the plants.

14. The hydroponic growth system of claim 13 further comprising at least one tube connecting the pump to an inlet of the at least one container and at least one tube connecting an outlet of the least one container to the reservoir.

15. The hydroponic growth system of claim 13 wherein the container is removable from the system.

16. The hydroponic growth system of claim 13, wherein the at least one container comprises a plurality of containers capable of growing the plants, the hydroponic growth system further comprising a plurality of tubes,
wherein one of the plurality of tubes connects the pump to a first of the plurality of containers, and another of the plurality of tubes connects the first of the plurality of containers to another of the plurality of containers.

17. The hydroponic growth system of claim 16 wherein the plurality of containers are arranged in a vertical arrangement.

18. The hydroponic growth system of claim 16 further comprising attaching a plurality of fluorescent lights so that at least one fluorescent light is attached above each of the plurality of containers.

19. The hydroponic growth system of claim 16 wherein one or more of the plurality of containers is removable from the system.

20. The hydroponic growth system of claim 12, where the lid of the at least one container comprises a plurality of openings adapted to promote plant growth through the lid.

21. The container of claim 1, wherein the lid is fixedly attached to tray inside the outer ridge by a plurality of securing columns and a plurality of slots.

22. A container comprising:
a tray having an outer ridge;
an inlet channel formed by and defined within the outer ridge of the tray, the inlet channel being an open channel;
a growth media retainer defining a recessed area within the tray and connected to the inlet channel downstream of said inlet channel, the recessed area having a perimeter completely surrounded by the outer ridge, the inlet channel winding around a portion of the perimeter of the recessed area;
a plurality of protrusions within the growth media retainer, said protrusions capable of securing growth media from lateral movement;
an outlet channel connected to the growth media retainer downstream of said growth media retainer; and
a lid fixedly attached to the tray inside the outer ridge to cover the entire recessed area so that the lid remains attached over the entire recessed area when the tray is turned upside down.

23. The container of claim 1, wherein the inlet channel is an open channel.

24. The container of claim 1, wherein the inlet channel winds around a portion of the perimeter of the recessed area.

25. The hydroponic growth system of claim 12, wherein the inlet channel is an open channel.

26. The hydroponic growth system of claim 12, wherein the inlet channel winds around a portion of the perimeter of the recessed area.

* * * * *